(12) United States Patent
Suzuki et al.

(10) Patent No.: US 8,976,764 B2
(45) Date of Patent: Mar. 10, 2015

(54) ACCOMMODATING SEMI-PERSISTENT SCHEDULING IN HETEROGENEOUS NETWORKS WITH RESTRICTED SUBFRAME PATTERNS

(75) Inventors: Takashi Suzuki, Ichikawa (JP); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 98 days.

(21) Appl. No.: 13/545,696

(22) Filed: Jul. 10, 2012

(65) Prior Publication Data

US 2013/0114573 A1    May 9, 2013

Related U.S. Application Data

(60) Provisional application No. 61/556,123, filed on Nov. 4, 2011.

(51) Int. Cl.
| | | |
|---|---|---|
| *H04J 3/00* | (2006.01) | |
| *H04L 1/18* | (2006.01) | |
| *H04W 16/32* | (2009.01) | |

(52) U.S. Cl.
CPC ............ *H04L 1/1887* (2013.01); *H04W 16/32* (2013.01)
USPC ........................................................ 370/336

(58) Field of Classification Search
CPC .............................. H04W 72/04; H04W 16/32
USPC ........................................................ 370/336
See application file for complete search history.

(56) References Cited

U.S. PATENT DOCUMENTS

| | | | | |
|---|---|---|---|---|
| 8,072,915 B1 * | 12/2011 | Gutierrez et al. | ............. | 370/318 |
| 8,743,723 B2 * | 6/2014 | Watfa et al. | ................... | 370/252 |
| 8,755,316 B2 | 6/2014 | Aschan et al. | | |
| 2002/0041575 A1 | 4/2002 | Karabinis et al. | | |
| 2003/0118123 A1 * | 6/2003 | Hudson et al. | ................ | 375/295 |
| 2003/0165120 A1 * | 9/2003 | Uesugi et al. | ................ | 370/282 |
| 2004/0240400 A1 | 12/2004 | Khan | | |

(Continued)

FOREIGN PATENT DOCUMENTS

TW    201127147 A    8/2011

OTHER PUBLICATIONS

Suzuki, Takashi, et al.; U.S. Appl. No. 13/250,486, filed Sep. 30, 2011; Title: Enhancement and Improvement for Hetnet Deployments.

(Continued)

*Primary Examiner* — Mark Rinehart
*Assistant Examiner* — Maharishi Khirodhar
(74) *Attorney, Agent, or Firm* — Conley Rose, P.C.; J. Robert Brown, Jr.

(57) ABSTRACT

A method is provided for operating a network element in a wireless communications network. The method comprises transmitting, by a network element configured to utilize time domain measurement resource restriction, a first initial transmission under a semi-persistent scheduling (SPS) scheme, wherein retransmissions of the first initial transmission follow a first retransmission pattern. The method further comprises transmitting, by the network element, a second initial transmission under the SPS scheme, wherein retransmissions of the second initial transmission follow a second retransmission pattern, the second retransmission pattern allowing at least one retransmission of the second initial transmission to occur in a restricted subframe.

28 Claims, 10 Drawing Sheets

(56) References Cited

U.S. PATENT DOCUMENTS

| | | | |
|---|---|---|---|
| 2006/0194576 | A1 | 8/2006 | Karabinis et al. |
| 2008/0192703 | A1 | 8/2008 | Suzuki |
| 2008/0207170 | A1 | 8/2008 | Khetawat et al. |
| 2008/0207229 | A1 | 8/2008 | Cave et al. |
| 2008/0279194 | A1 | 11/2008 | Tseng |
| 2009/0092103 | A1 | 4/2009 | Rao |
| 2009/0103500 | A1* | 4/2009 | Malkamaki et al. ......... 370/336 |
| 2009/0143072 | A1 | 6/2009 | Montojo et al. |
| 2009/0225708 | A1* | 9/2009 | Harada et al. ................ 370/329 |
| 2010/0034139 | A1 | 2/2010 | Love et al. |
| 2010/0074206 | A1 | 3/2010 | Yu et al. |
| 2010/0095183 | A1 | 4/2010 | Petrovic et al. |
| 2010/0167750 | A1 | 7/2010 | Lee et al. |
| 2010/0182939 | A1* | 7/2010 | Ojala et al. .................... 370/280 |
| 2010/0227606 | A1* | 9/2010 | Nan et al. .................... 455/422.1 |
| 2010/0272004 | A1 | 10/2010 | Maeda et al. |
| 2010/0296427 | A1 | 11/2010 | Lohr et al. |
| 2010/0322174 | A1 | 12/2010 | Ji et al. |
| 2011/0038277 | A1 | 2/2011 | Hu et al. |
| 2011/0053625 | A1* | 3/2011 | Ishii et al. .................... 455/507 |
| 2011/0223924 | A1* | 9/2011 | Lohr et al. .................... 455/450 |
| 2011/0270984 | A1 | 11/2011 | Park |
| 2012/0044818 | A1* | 2/2012 | Lindoff et al. ................ 370/252 |
| 2012/0113843 | A1 | 5/2012 | Watfa et al. |
| 2012/0115485 | A1 | 5/2012 | Narasimha et al. |
| 2012/0170541 | A1 | 7/2012 | Love et al. |
| 2012/0307922 | A1 | 12/2012 | Simonsson et al. |
| 2013/0039338 | A1 | 2/2013 | Suzuki et al. |
| 2013/0077507 | A1 | 3/2013 | Yu et al. |
| 2013/0128765 | A1 | 5/2013 | Yang et al. |

OTHER PUBLICATIONS

Suzuki, Takashi; U.S. Appl. No. 13/545,674, filed Jul. 10, 2012; Title: Paging in Heterogeneous Networks Using Restricted Subframe Patterns.

Suzuki, Takashi, et al.; U.S. Appl. No. 13/545,700, filed Jul. 10, 2012; Title: Paging in Heterogeneous Networks with Discontinuous Reception.

3GPP TS 36.300 V10.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2, Release 10; Jun. 2011; 194 pages.

3GPP TR 36.805 V1.2.0; 3rd Generation Partnership Project; Technical Specification Group Radio Access Network; Study on Minimization of Drive-Tests in Next Generation Networks; Release 9; Aug. 2009; 18 pages.

3GPP TS 36.331 V10.2.0; 3rd Generation Partnership Project; Technical Specification Group Radio Access Network; Evolved Universal Terrestrial Radio Access (E-UTRA); Radio Resource Control (RRC); Protocol Specification; Release 10; Jun. 2011; 294 pages.

3GPP TS 36.304 V10.2.0; 3rd Generation Partnership Project; Technical Specification Group Radio Access Network; Evolved Universal Terrestrial Radio Access (E-UTRA); User Equipment (UE) Procedures in Idle Mode; Release 10; Jun. 2011; 33 pages.

3GPP TS 36.321 V10.2.0; 3rd Generation Partnership Project; Technical Specification Group Radio Access Network; Evolved Universal Terrestrial Radio Access (E-UTRA); Medium Access Control (MAC) Protocol Specification; Release 10; Jun. 2011; 54 pages.

3GPP TS 37.320 V10.2.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Radio Measurement Collection for Minimization of Drive Tests (MDT); Overall Description; Stage 2, Release 10; Jun. 2011; 17 pages.

3GPP TS 36.211 V10.2.0; 3rd Generation Partnership Project; Technical Specification Group Radio Access Network; Evolved Universal Terrestrial Radio Access (E-UTRA); Physical Channels and Modulation; Release 10; Jun. 2011; 103 pages.

3GPP TS 36.321 V10.5.0; 3rd Generation Partnership Project; Technical Specification Group Radio Access Network; Evolved Universal Terrestrial Radio Access (E-UTRA); Medium Access Control (MAC) Protocol Specification; Release 10; Mar. 2012; 54 pages.

3GPP TS 36.304 V10.6.0; 3rd Generation Partnership Project; Technical Specification Group Radio Access Network; Evolved Universal Terrestrial Radio Access (E-UTRA); User Equipment (UE) Procedures in Idle Mode; Release 10; Jun. 2012; 33 pages.

3GPP TS 36.331 V10.6.0; 3rd Generation Partnership Project; Technical Specification Group Radio Access Network; Evolved Universal Terrestrial Radio Access (E-UTRA); Radio Resource Control (RRC); Protocol Specification; Release 10; Jun. 2012; 302 pages.

3GPP TS 36.300 V10.8.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2, Release 10; Jun. 2012; 194 pages.

3GPP TS 36.213 V10.6.0; 3rd Generation Partnership Project; Technical Specification Group Radio Access Network; Evolved Universal Terrestrial Radio Access (E-UTRA); Physical Layer Procedures; Release 10; Jun. 2012; 125 pages.

3GPP TSG-RAN WG2 Meeting #75bis; "Connected Mode Paging Enhancement"; R2-115347; Zhuhai, China; Oct. 10-14, 2011; 2 pages.

3GPP TSG-RAN WG2 Meeting #75; "Measurement Restriction for Inter-Frequency eICIC"; R2-113790; Athens, Greece; Aug. 22-26, 2011; 3 pages.

3GPP TSG-RAN WG2 Meeting #75; "Measurement Resource Restrictions for UE Rx-Tx Time Difference"; R2-114292; Athens, Greece; Aug. 22-26, 2011; 2 pages.

3GPP TSG-RAN WG2 Meeting #75; "Use Cases and Main Issues for Idle Mode eICIC"; R2-114436; Athens, Greece; Aug. 22-26, 2011; 3 pages.

3GPP TSG-RAN WG2 Meeting #75; "Correcting the Ambiguity of Modification-Period Boundaries"; R2-114447; Athens, Greece; Aug. 22-26, 2011; 7 pages.

PCT Search Report; Application No. PCT/US2012/035864; Nov. 28, 2012; 3 pages.

PCT Written Opinion of the International Searching Authority; Application No. PCT/US2012/035864; Nov. 28, 2012; 4 pages.

PCT Search Report; Application No. PCT/US2012/62806; Jan. 18, 2013; 2 pages.

PCT Written Opinion of the International Searching Authority; Application No. PCT/US2012/62806; Jan. 18, 2013; 6 pages.

PCT Search Report; Application No. PCT/US2012/62807; Jan. 18, 2013; 2 pages.

PCT Written Opinion of the International Searching Authority; Application No. PCT/US2012/62807; Jan. 18, 2013; 5 pages.

PCT Search Report; Application No. PCT/US2012/62808; Jan. 18, 2013; 2 pages.

PCT Written Opinion of the International Searching Authority; Application No. PCT/US2012/62808; Jan. 18, 2013; 7 pages.

Office Action dated Sep. 18, 2013; U.S. Appl. No. 13/250,486, filed Sep. 30, 2011; 26 pages.

Office Action dated Apr. 25, 2014; U.S. Appl. No. 13/250,486, filed Sep. 30, 2011; 13 pages.

Office Action dated Mar. 21, 2014; U.S. Appl. No. 13/545,674, filed Jul. 10, 2012; 27 pages.

Notice of Allowance dated Aug. 19, 2014; U.S. Appl. No. 13/250,486, filed Sep. 30, 2011; 15 pages.

Notice of Allowance dated Jul. 30, 2014; U.S. Appl. No. 13/545,674, filed Jul. 10, 2012; 18 pages.

Final Office Action dated Jun. 27, 2014; U.S. Appl. No. 13/545,700, filed Jul. 10, 2012; 29 pages.

Taiwan Office Action; Application No. 101140883; Jun. 10, 2014; 12 pages.

Notice of Allowance dated Oct. 10, 2014; U.S. Appl. No. 13/545,700, filed Jul. 10, 2012; 19 pages.

(56) References Cited

OTHER PUBLICATIONS

Taiwan Office Action; Application No. 101140890; Jul. 17, 2014; 14 pages.
Taiwan Office Action; Application No. 101140891; Sep. 5, 2014; 11 pages.

Suzuki, Takashi; U.S. Appl. No. 14/537,278, filed Nov. 10, 2014; Title: Paging in Heterogeneous Networks Using Restricted Subframe Patterns; 65 pages.
Office Action dated Dec. 3, 2014; U.S. Appl. No. 13/250,486, filed Sep. 30, 2011; 8 pages.

* cited by examiner

ACCOMMODATING SEMI-PERSISTENT SCHEDULING IN HETEROGENEOUS NETWORKS WITH RESTRICTED SUBFRAME PATTERNS

CROSS-REFERENCE TO RELATED APPLICATIONS

The present application claims priority to U.S. Provisional Patent Application No. 61/556,123, filed Nov. 4, 2011 by Takashi Suzuki, et al., entitled "Accommodating Semi-Persistent Scheduling in Heterogeneous Networks with Restricted Subframe Patterns" which is incorporated by reference herein as if reproduced in its entirety.

BACKGROUND

As telecommunications technology has evolved, more advanced network access equipment has been introduced that can provide services that were not possible previously. This network access equipment might include systems and devices that are improvements of the equivalent equipment in a traditional wireless telecommunications system. Such advanced network access equipment may be included in evolving wireless communications standards, such as long-term evolution (LTE). For example, in an LTE system the advanced network access equipment might include an Evolved Universal Terrestrial Radio Access Network (E-UTRAN) node B (eNB). In various wireless communications systems, the advanced network access equipment may include a base station a wireless access point, or a similar component operable as an access node according to a corresponding wireless communications standard. Any such component will be referred to herein as an eNB, but it should be understood that such a component is not necessarily an eNB. Such a component may also be referred to herein as an access node or base station.

LTE may be said to correspond to Third Generation Partnership Project (3GPP) Release 8 (Rel-8 or R8), Release 9 (Rel-9 or R9), and Release 10 (Rel-10 or R10), and possibly also to releases beyond Release 10, while LTE Advanced (LTE-A) may be said to correspond to Release 10 and possibly also to releases beyond Release 10. While the present disclosure is described in relation to an LTE-A system, the concepts are equally applicable to other wireless communications systems as well.

As used herein, the term "user equipment" (alternatively "UE") refers to equipment that communicates with an access node to obtain services via the wireless communications system. A UE might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

BRIEF DESCRIPTION OF THE DRAWINGS

For a more complete understanding of this disclosure, reference is now made to the following brief description, taken in connection with the accompanying drawings and detailed description, wherein like reference numerals represent substantially similar parts.

FIG. 6 is a diagram depicting a subframe pattern and VoLTE SPS transmissions.

FIG. 7 is a diagram depicting SPS retransmissions aligned with a 1/8 subframe pattern, according to an embodiment of the disclosure.

FIG. 9 is a diagram depicting a 1/10 subframe pattern and VoLTE traffic, according to an embodiment of the disclosure.

FIG. 10 is a diagram depicting a VoLTE-specific subframe pattern, according to an embodiment of the disclosure.

DETAILED DESCRIPTION

Figure 1:
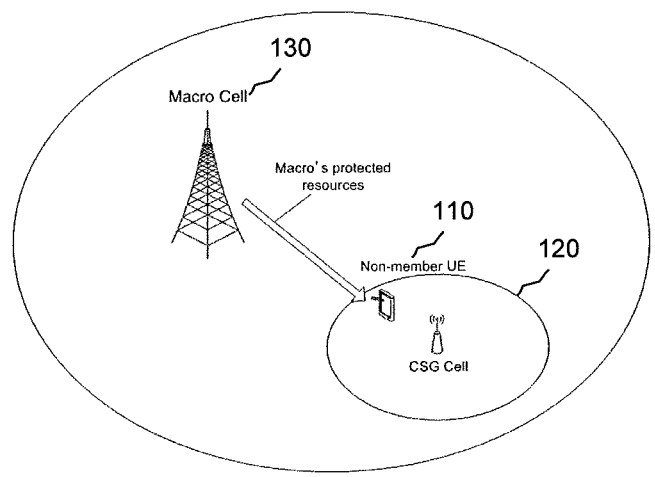
FIG. 1 is a diagram of a closed subscriber group HetNet deployment.

In wireless telecommunications systems, transmission equipment in an access node transmits signals throughout a geographical region referred to as a cell. One type of access node, such as an eNB, may be associated with a macro cell. Another type of access node, such as a low power node (e.g., femto cells, relays, or pico cells), may be associated with a low power cell. A heterogeneous network (HetNet) is a network that can include macro cells and low-power cells. For example, a HetNet may include a system of macro cells that operate at high power levels, and a system of low power cells, such as pico cells and relay nodes, which operate at reduced power levels. The low power cells can be overlaid on top of the macro cells, possibly sharing the same frequency. The low power cells may be used to offload the macro cells, improve coverage, and/or increase network performance. 3GPP has studied HetNet deployments as a performance enhancement enabler in LTE-Advanced (Release 10). In HetNet deployments, inter-cell interference coordination (ICIC) can prevent interference between the signals transmitted by the macro cell and the low-power nodes. Time domain-based resource sharing or coordination has been adopted as enhanced ICIC (eICIC). As described in 3GPP Technical Specification (TS) 36.300, the deployment scenarios where eICIC is utilized may include a closed subscriber group (CSG) (also referred to as femto cell) scenario and a pico cell scenario.

In the CSG scenario, a dominant interference condition may occur when non-member users are in close proximity to a CSG cell. Typically, the Physical Downlink Control Channel (PDCCH) might be severely interfered with by downlink transmissions from a non-member CSG cell. Interference to the PDCCH of the macro cell can have a detrimental impact on both uplink and downlink data transfer between the UE and the macro cell. In addition, other downlink control channels and reference signals, from both the macro cell and the neighbor cells, that may be used for cell measurements and radio link monitoring can also be interfered with by a downlink transmission from a non-member CSG cell. Depending on network deployment and strategy, it may not be possible to divert the users suffering from inter-cell interference to another E-UTRA (Evolved UMTS (Universal Mobile Telecommunications System) Terrestrial Radio Access) carrier or another radio access technology (RAT). Time domain ICIC may be used to allow such non-member UEs to remain served by the macro cell on the same frequency layer. Such interference may be mitigated by the CSG cell utilizing Almost Blank Subframes (ABSs) to protect the corresponding macro cell's subframes from the interference. ABSs are subframes with reduced transmit power and/or reduced activity (possibly including no transmission) on some physical channels. A non-member UE may be signaled to utilize the protected resources for radio resource management (RRM) measurements, radio link monitoring (RLM) and channel state information (CSI) measurements for the serving macro cell, allowing the UE to continue to be served by the macro cell under strong interference from the CSG cell.

An example of the CSG scenario is shown in FIG. 1. Since a UE 110 that is not a member of a CSG is within the coverage area of the CSG cell 120, signals from the CSG cell 120 could interfere with signals sent to the UE 110 from a macro cell 130.

In the pico scenario, time domain ICIC may be utilized for pico users that are served in the edge of the serving pico cell, e.g., for traffic off-loading from a macro cell to a pico cell. Typically, the PDCCH might be severely interfered with by downlink transmission from the macro cell. In addition, other downlink control channels and reference signals, from both the pico cell and neighbor pico cells, that may be used for cell measurements and radio link monitoring can also be interfered with by a downlink transmission from the macro cell. Time domain ICIC may be utilized to allow such UEs to remain served by the pico cell on the same frequency layer. Such interference may be mitigated by the macro cell utilizing ABSs to protect the corresponding pico cell's subframes from the interference. A UE served by a pico cell can use the protected resources for RRM, RLM, and CSI measurements for the serving pico cell.

Figure 2:
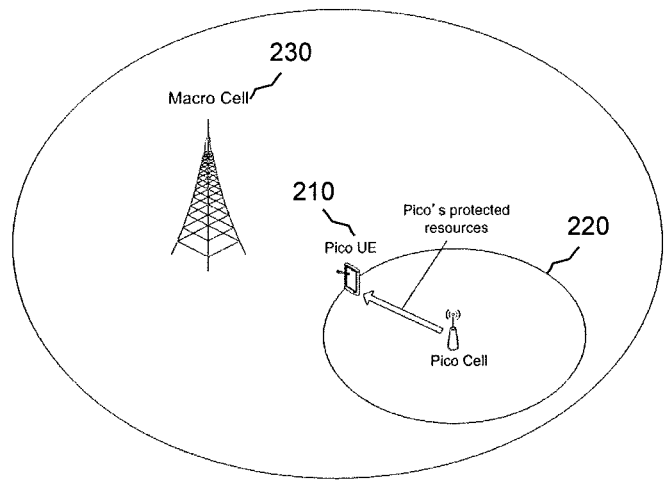
FIG. 2 is a diagram of a pico HetNet deployment.

An example of the pico scenario is shown in FIG. 2. A UE 210 that is at the edge of the coverage area of a pico cell 220 might be close enough to a macro cell 230 that signals from the macro cell 230 could interfere with signals sent to the UE 110 from the pico cell 220.

For time domain ICIC, subframe utilization across different cells can be coordinated in time through backhaul signaling or configuration of patterns in the ABS. The ABSs in an aggressor cell can be used to protect resources in subframes in a victim cell receiving strong inter-cell interference. The ABS pattern is used to identify subframes (referred to as "restricted" subframes or "protected" subframes) during which the aggressor cell transmits an almost blank subframe. The restricted subframes provide an opportunity to measure transmissions from the victim cell more accurately because there should be less or no interference from the aggressor cell.

The serving eNB can ensure backwards compatibility toward UEs by transmitting necessary control channels and physical signals as well as system information during the restricted subframes. Patterns based on ABSs can be signaled to the UE to cause the UE to restrict measurements to specific subframes. These restrictions may be time domain measurement resource restrictions. There are different patterns depending on the type of measured cell (serving or neighbor cell) and measurement type (e.g., RRM or RLM).

Figure 3:
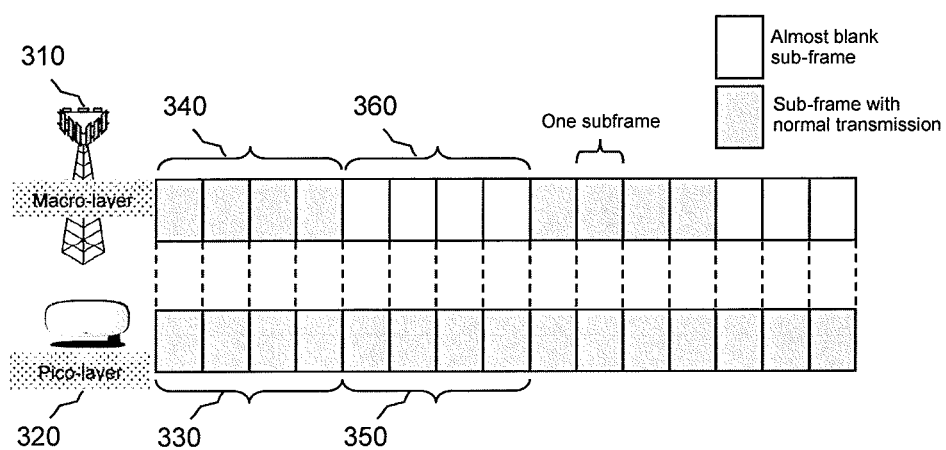
FIG. 3 is a diagram of examples of almost blank subframes.

An example of an ABS pattern for the pico scenario is shown in FIG. 3. In this example, a macro eNB 310 (the aggressor) configures and transfers the ABS patterns to a pico eNB 320 (the victim). To protect the UEs served by the pico eNB 320 in the edge of the pico cell, the macro eNB 310 does not schedule data transmissions in ABS subframes. The pico eNB 320 may rely upon the ABS pattern to schedule transmissions to various UEs in the restricted subframes. For example, the pico eNB 320 may schedule transmissions to and from a first UE regardless of the ABS patterns, such as when the first UE is in the cell center. Alternatively, the pico eNB 320 may schedule transmissions to and from a second UE only in the restricted subframes indicated by the ABS pattern, such as when the second UE is near the cell edge.

In other words, the pico layer subframes 330 that occur at substantially the same time as the macro layer subframes 340 may be said to be aligned with those macro layer subframes 340. In subframes 340 where the macro eNB 310 is active, the pico eNB 320, in subframes 330, schedules only those UEs without excessive range extension. During pico layer subframes 350 that are aligned with almost blank macro eNB subframes 360, the pico eNB 320 can also schedule UEs that have large range extension offsets and that would otherwise not be schedulable due to too much interference from the macro layer 310.

The pico cell eNB may configure a UE at the edge of the cell with three different measurement resource restrictions independently based on an ABS pattern received from the macro cell eNB. The first restriction is for RRM measurement and RLM for the Primary cell, that is, PCell (in this case the serving pico cell). If configured, the UE measures and performs RLM of the PCell only in the restricted subframes. The second restriction is for RRM measurement of neighbor cells on the primary frequency. If configured, the UE measures neighbor cells in the restricted subframes only. The restriction also contains target neighbor cells optionally. The third restriction is for channel state estimation of the PCell. If configured, the UE estimates CSI and CQI/PMI/RI in the restricted subframes only.

The subframe pattern for the measurement restrictions in the RRC protocol in version 10.3.0 of 3GPP TS 36.331 is defined as shown in Text Box 1 at the end of the Detailed Description section of this document. In frequency division duplexing (FDD), the pattern is repetition of 40 subframes and in TDD the pattern is repetition of 20, 60 and 70 subframes depending on the configuration.

Sections 5.2.1.3 to 5.2.1.5 of version 10.3.0 of the RRC specification (3GPP TS 36.331) explain how paging is used to notify the UE of a change in system information and/or the arrival of Earthquake and Tsunami Warning System (ETWS) messages or Commercial Mobile Alert Service (CMAS) messages. These sections of 3GPP TS 36.331 are reproduced as Text Box 2 at the end of the Detailed Description section of this document. When a change in system information occurs, the UE attempts to read at least modificationPeriodCoeff times during the modification period, and for ETWS and CMAS notification the UE attempts to read at least once every defaultPagingCycle.

The paging frame and paging occasion are defined in sections 7.1 and 7.2 of version 10.3.0 of 3GPP TS 36.304. These sections are reproduced as Text Box 3 at the end of the Detailed Description section of this document. The paging frame and paging occasion depend on the International Mobile Subscriber Identity (IMSI) of the UE. In idle mode, the UE monitors a specific paging occasion in a paging frame. If there is a paging message for the UE, the paging occasion will include a resource block assignment where the UE should receive the paging message. In idle mode, the UE should check at least one paging occasion per default paging cycle (or per discontinuous reception (DRX) cycle).

Figure 5A:
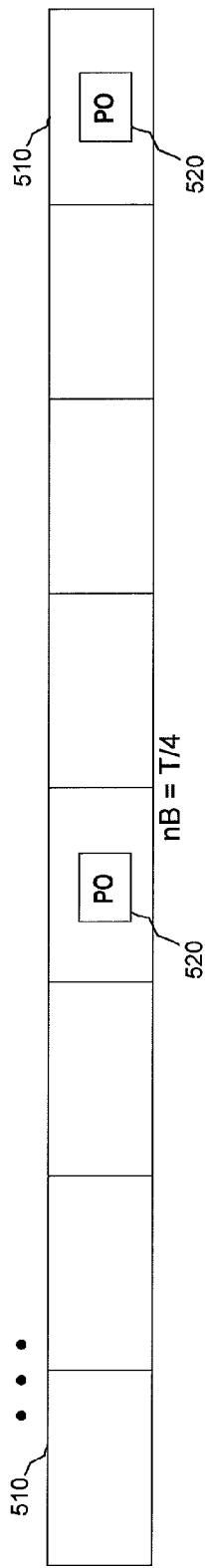
FIGS. 5a, 5b, and 5c are diagrams of paging occasions, the nB parameter, and a restricted subframe, according to an embodiment of the disclosure.
Figure 5B:
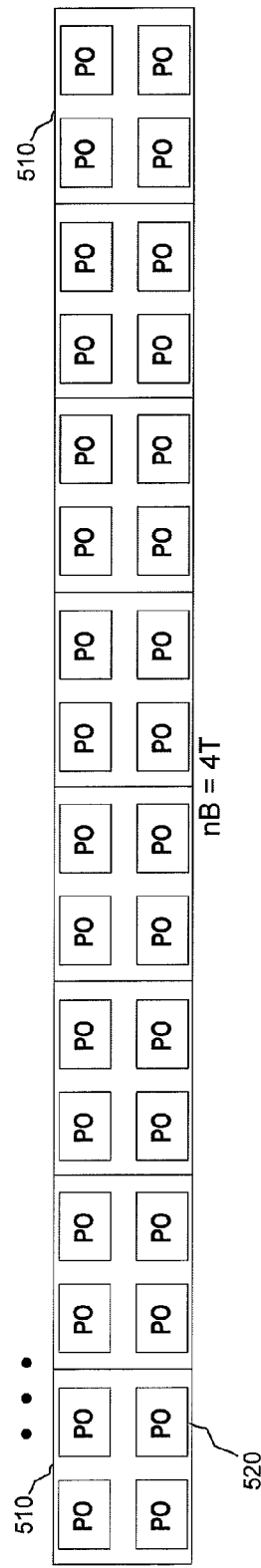
Figure 5C:
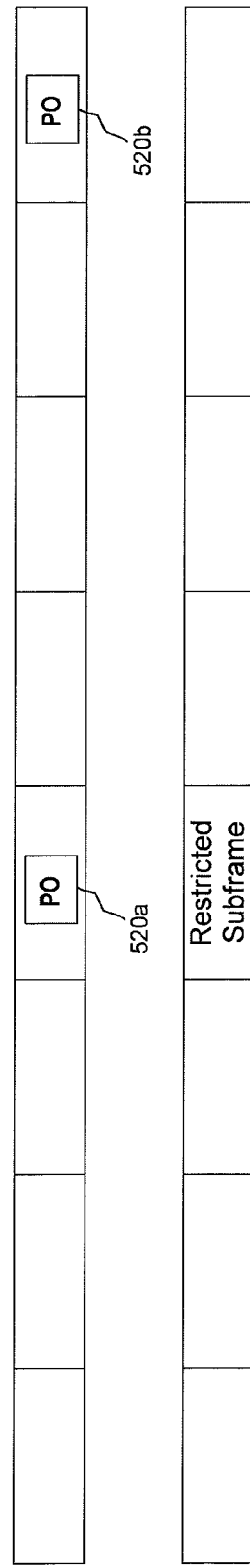

In connected mode, the UE may also receive paging messages for a system information change or for ETWS/CMAS notification. Since those notifications are common for all UEs, a UE may read paging messages in any available paging occasions. It should be noted that the density of the paging frames is dependent upon the parameter nB. The busier a network is, the more paging needs to occur, and the higher the value of nB will be. For example, as shown in FIG. 5a, if nB is set to T/4, every fourth radio frame 510 contains a paging occasion 520. As shown in FIG. 5b, if nB is set to 4T, every radio frame 510 contains four paging occasions 520. FIG. 5c depicts a paging occasion 520a that is aligned with a restricted subframe 530 and a paging occasion 520b that is not aligned with a restricted subframe.

Parameters related to paging are signaled by the RRC protocol as specified in version 10.3.0 of 3GPP TS 36.331 and as shown in Text Box 4 at the end of the Detailed Description section of this document. PCCH Config contains the default paging cycle and nB. BCCH Config contains the modification period coefficient.

DRX operation in connected mode is defined in section 5.7 of version 10.3.0 of the Medium Access Control (MAC) specification, 3GPP TS 36.321. That section is reproduced as Text Box 5 at the end of the Detailed Description section of this document. The UE monitors the PDCCH in active time including the on-duration period. The start of the on-duration period is determined by a DRX start offset and a DRX cycle length. The objective of the DRX start offset is to evenly distribute traffic to be handled over each subframe. It should be noted that the UE might need to monitor the PDCCH according to other requirements, such as the paging channel reception described in section 5.5 of 3GPP TS 36.321.

A restricted subframe pattern for measurement resource restriction in the following examples includes one restricted subframe out of eight subframes (also referred to as a 1/8 restricted subframe pattern). A 1/8 restricted subframe pattern is a typical subframe pattern and is commonly used due to the minimum round trip time associated with a Hybrid Automatic Repeat Request (HARQ) process. The restricted subframe pattern may be a 40-bit string (in FDD) where the 8-bit subframe pattern is repeated five times. For example, if the first subframe of every eight subframes is configured as a restricted subframe, the restricted subframe pattern may be "10000000 10000000 10000000 10000000 10000000". This restricted subframe pattern may also be referred to as RSFP 0 since the subframe at position 0 is the restricted subframe.

Figures 6, 7:
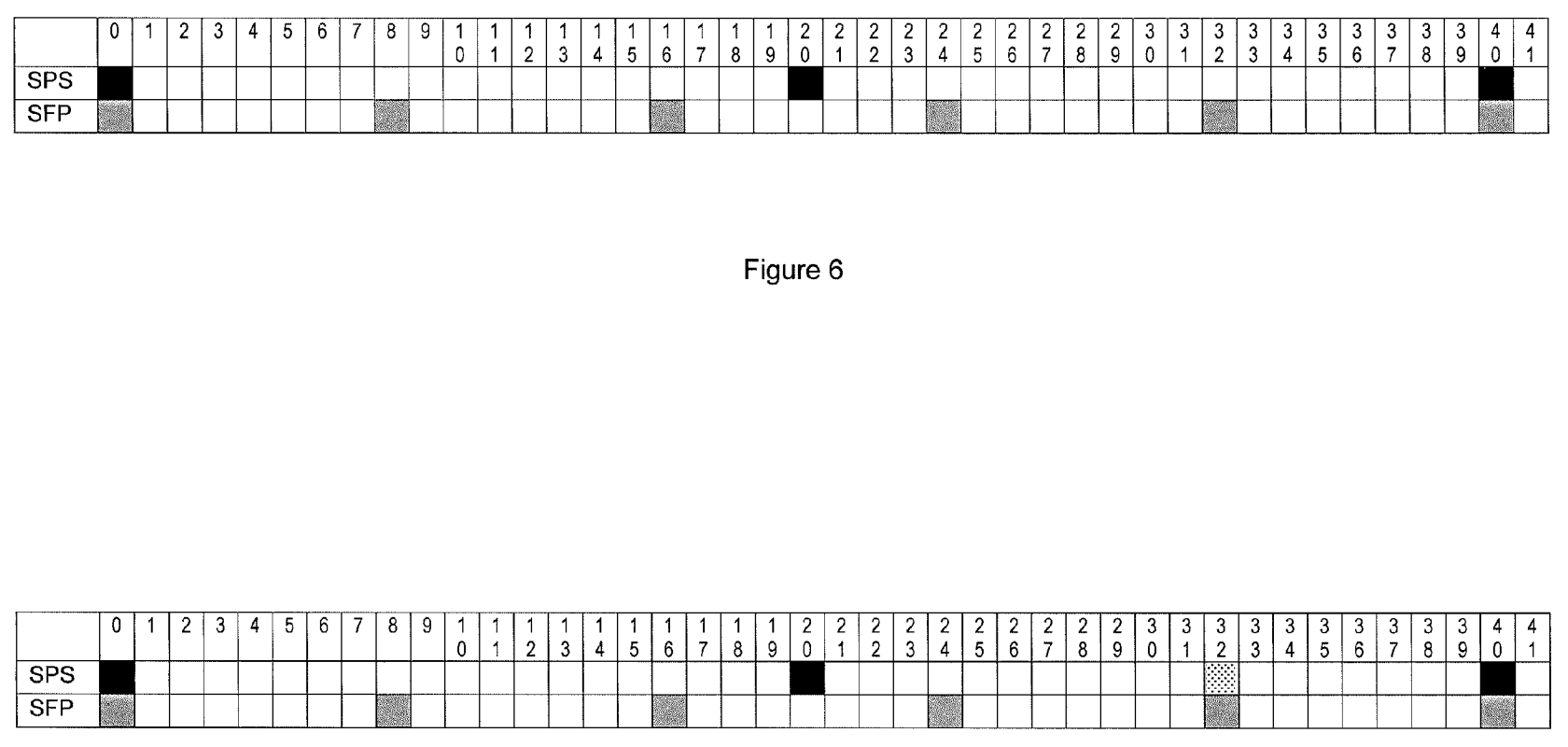

This disclosure is related to the alignment between semi-persistent scheduling (SPS) and restricted subframe patterns. Voice over LTE (VoLTE) is an example of a service that may rely on SPS resources. FIG. 6 shows an SPS resource and a 1/8 restricted subframe pattern. A darkly shaded square represents initial transmission (e.g. subframes at positions 0, 20, 40), a lightly shaded square represents possible retransmission (e.g. subframes at positions 8, 16, 28, 36), and a medium shaded square represents a protected subframe (e.g. subframes at position 0, 8, 16, 24, 32, 40) according to a 1/8 subframe pattern. An initial transmission (at subframe position 0) may be followed by corresponding retransmissions (at subframe positions 8, 16) if the initial transmission is unsuccessful. A second data transmission at subframe 20 may be followed by corresponding retransmissions (at subframe positions 28, 36) if the second data transmission is unsuccessful.

As shown in the figure, the 1/8 pattern provides protected subframes aligned with the initial transmission (subframe position 0) and corresponding retransmission opportunities (at subframe positions 8, 16). However, the 1/8 pattern does not provide protected subframes that correspond to the second data transmission (at subframe position 20), nor the corresponding retransmissions (at subframe positions 28, 36). There is no PDCCH required when using downlink SPS for configured transmissions. However, retransmissions and changes of HARQ information (e.g., modulation and coding) might require PDCCH transmissions, and the PDCCH transmissions should be protected. Without proper protection, voice quality could be degraded.

A 1/8 subframe pattern may not align to VoLTE traffic properly to provide protection for all configured SPS subframes. In view of this potential misalignment, this disclosure addresses the relationship between SPS and restricted subframe patterns. Example embodiments using a 1/8 subframe patterns will be described first. However, embodiments using other subframe patterns should be apparent to those of skill in the art.

Since there may not be a PDCCH when using configured SPS transmissions, some of the initial transmissions may be left unprotected by the subframe patterns if the configured SPS transmissions on the Physical Downlink Shared Channel (PDSCH) are placed by the eNB scheduler in resource blocks with reasonable interference. In order to protect retransmissions that require the PDCCH, the eNB may schedule retransmissions in restricted subframes. For example, in FIG. 7, the initial transmission in the subframe 20 highlighted with dark shading is not protected. If retransmission is needed, the eNB retransmits in the protected subframe 32. When the eNB needs to reconfigure the HARQ information (e.g., modulation and coding), the eNB can activate or reactivate SPS at the subframes that are protected by the subframe pattern. A similar procedure can be applied when SPS is released. In FIG. 7, the eNB may use subframes 0, 40, and 80 (not shown) for activating, reactivating, or releasing SPS, since those subframes would align with the subframe pattern.

If the network begins modifying retransmission subframes to align with the restricted subframe pattern, it may result in different numbers of retransmissions for the first and second protocol data units (PDU), which may cause voice quality degradation. For the first PDU, third PDU, (the first set of PDUs), three retransmission opportunities are available, while for the second PDU, fourth PDU, . . . (the second set of PDUs), there may only be one chance for retransmission. In an embodiment, the eNB may apply a conservative modulation and coding for both sets of PDUs. Alternatively, more robust modulation and coding may be applied only to the second set of PDUs (because those PDUs would have fewer opportunities for retransmission aligned with the restricted subframe pattern).

In another embodiment, the network may use a 40 ms SPS interval instead of 20 ms in order to better align the SPS transmissions to a 1/8 subframe pattern. However, this increases the latency by 20 ms in the air interface delay budget. Adaptation of more advanced coding and decoding in the future may require a longer processing time than the currently available coding and decoding, for example adaptive multi-rate (AMR). Therefore, it may be preferable for the air interface delay budget to be kept as is.

Figure 8:
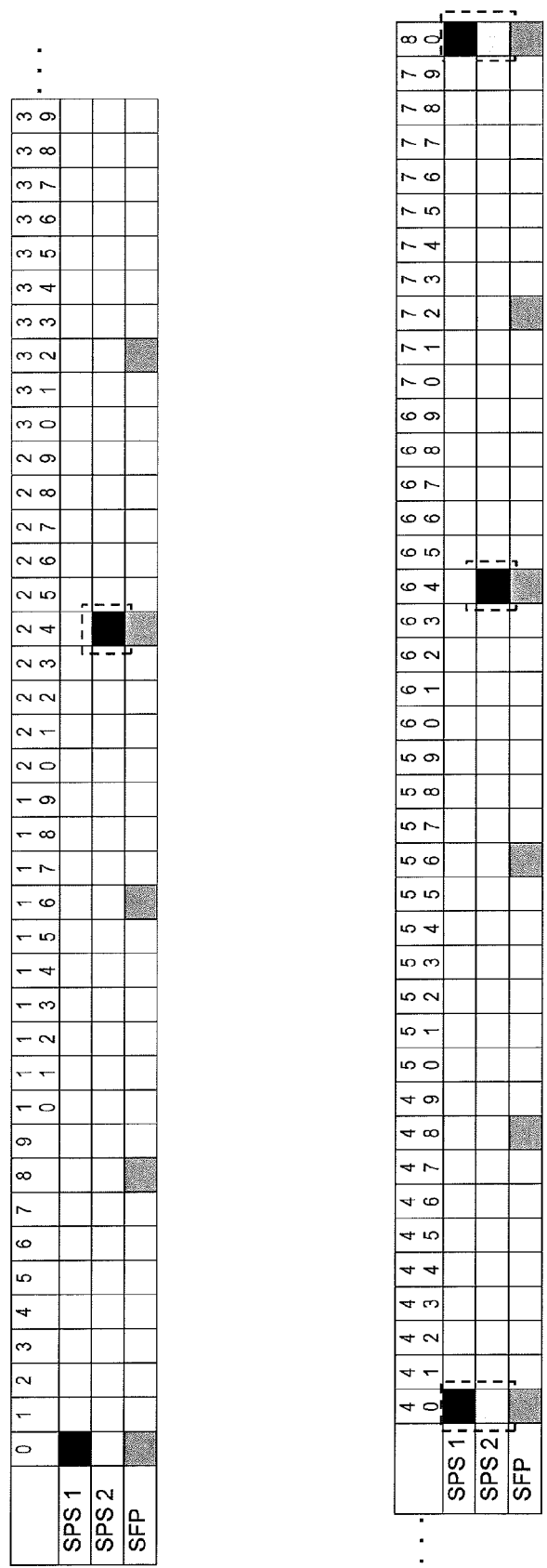
FIG. 8 is a diagram depicting two SPSs aligned with a 1/8 subframe pattern, according to an embodiment of the disclosure.

Alternatively, two sets of 40 ms SPS intervals may be used as shown in FIG. 8. The offset between the two SPS intervals is 24 subframes. In this example, a 1/8 subframe pattern can be used. However, as highlighted in the outlined boxes at subframes 24, 40, 64, and 80, there is a four-subframe latency between every other initial transmission. There is also a possible collision between the second retransmission (e.g. SPS 2 at subframe 40) and the next new transmission (e.g. SPS 1 at subframe 40). To avoid a possible collision with the second retransmission, the number of retransmissions may be limited to one.

Figures 9, 10:
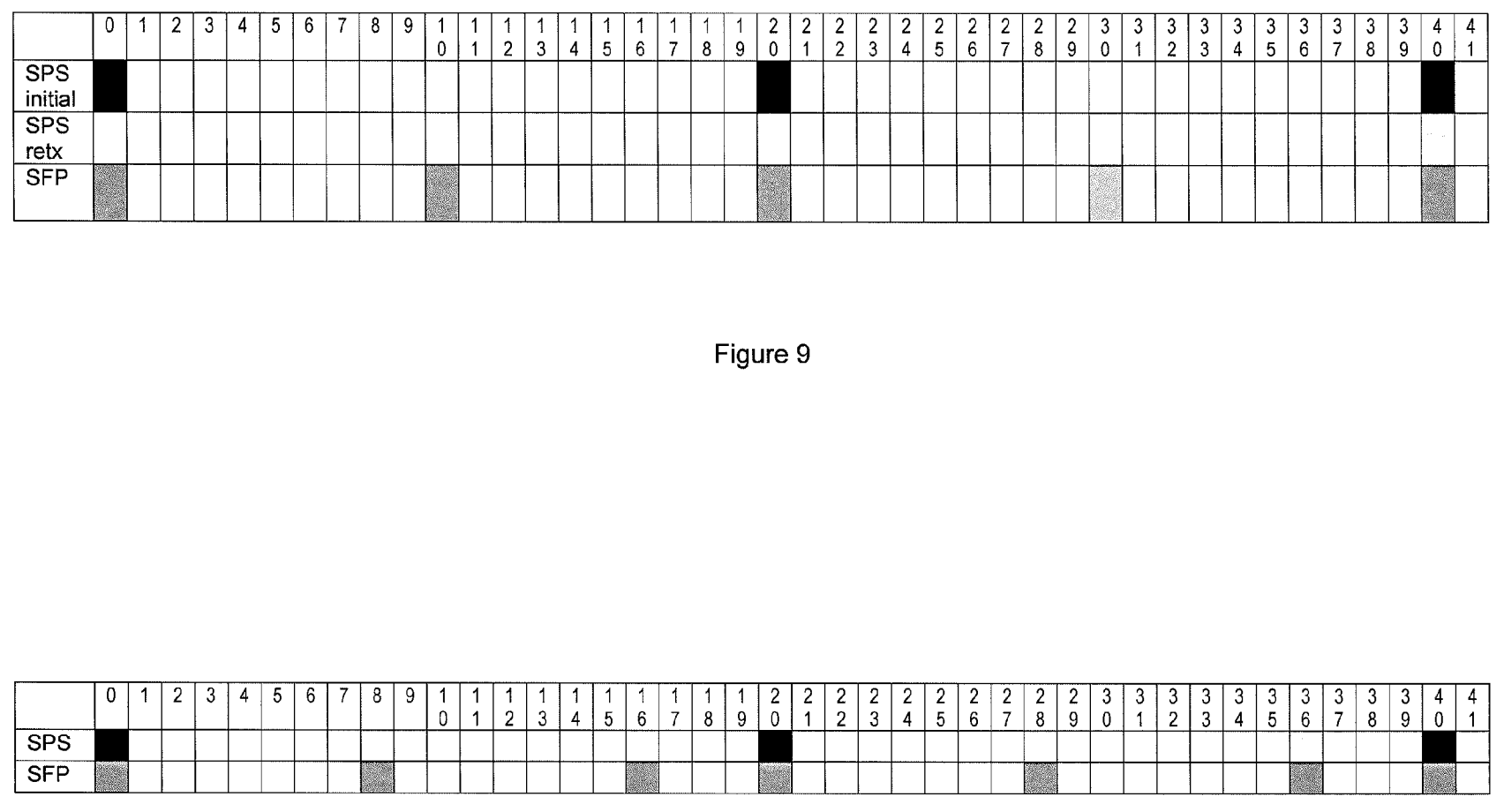

FIG. 9 shows an example embodiment based on a 1/10 subframe pattern which may be used to support VoLTE traffic. In this example, all the initial transmissions and retransmissions align with the subframe pattern. However, the second retransmission (SPS retx at subframe 20) collides with the next new transmission (SPS initial at subframe 20). According to the current MAC specification (3GPP TS 36.321), in the case of a collision, a retransmission is processed but a configured new transmission is not processed. The UE may process both an SPS retransmission and a new transmission in the same subframe in the case of a collision. Category 6 UEs or higher category UEs may handle such parallel processing of multiple transport blocks since they can handle at least four transport blocks in one subframe. Therefore, parallel reception in the example subframe 20 can be used to allow both the retransmission and the new transmission in the same subframe. In other embodiments, the number of retransmissions could be limited to one. This limitation may be acceptable in a scenario where the interference during the protected subframes is low and one retransmission is sufficient for successful decoding.

In the yet another alternative, a VoLTE-specific subframe pattern may be used as shown in FIG. 10. In this case, the subframe pattern is made to align to SPS configured transmissions. In the case of FDD, the subframe pattern may still be a 40-bit subframe pattern, but would not be based on an 8-bit repeating string. Instead, the 40-bit subframe pattern may be configured such that the restricted subframes include the potential transmissions and retransmissions. The example in FIG. 10 uses a subframe pattern of "10000000 10000000 10001000 00001000 00001000."

In downlink SPS, the PDCCH is used to schedule SPS retransmissions. In a HetNet environment, available subframes for retransmission are limited due to subframe patterns, which can result in VoLTE traffic being concentrated on a specific subframe. In order to increase the capacity of VoLTE in a HetNet environment, the downlink HARQ scheme may be changed from asynchronous adaptive to synchronous non-adaptive when the PDCCH is not used in retransmission. In order to cope with frequency-dependent fading, frequency hopping and redundancy versions for the retransmission may be predetermined. In one scenario, since the PDCCH is absent in the downlink retransmissions, the modulation and coding scheme and resource block allocation could be the same as in the initial transmission. Further, some HARQ processes could be reserved for this purpose in order to ensure that the UE is aware of which HARQ process is used for this retransmission (similar to the uplink case). The redundancy version (RV) index could be dependent on the index of the retransmissions or the subframes so the UE could determine how to derive the corresponding RV to decode the received transport blocks.

Referring again to FIG. 7, a further embodiment is described. In this example embodiment, the UE may selectively apply different modulation and coding schemes based upon whether the restricted subframe pattern aligns with the subframe for initial transmission or retransmissions. For example, the UE may apply the second (more robust) modulation and coding to the second set of PDUs. To indicate that the UE should do so, SPS Configuration in RRC signaling (3GPP TS 36.331) could be extended as shown in an embodiment of the disclosure below.

```
SPS-Config
The IE SPS-Config is used to specify the semi-persistent scheduling configuration.
SPS-Config information element
-- ASN1START
SPS-Config ::= SEQUENCE {
    semiPersistSchedC-RNTI       C-RNTI           OPTIONAL,     -- Need OR
    sps-ConfigDL                 SPS-ConfigDL     OPTIONAL,     -- Need ON
    sps-ConfigUL                 SPS-ConfigUL     OPTIONAL      -- Need ON
}
SPS-ConfigDL ::=       CHOICE{
    release                      NULL,
    setup                        SEQUENCE {
        semiPersistSchedIntervalDL       ENUMERATED {
                                             sf10, sf20, sf32, sf40, sf64, sf80,
                                             sf128, sf160, sf320, sf640, spare6,
                                             spare5, spare4, spare3, spare2,
                                             spare1},
        numberOfConfSPS-Processes        INTEGER (1..8),
        n1PUCCH-AN-PersistentList        N1PUCCH-AN-PersistentList,
        ...,
        [[ twoAntennaPortActivated-r10   CHOICE {
            release                          NULL,
            setup                            SEQUENCE {
```

```
        n1PUCCH-AN-PersistentListP1-r10  N1PUCCH-AN-PersistentList
                }
            }                                               OPTIONAL    -- Need ON
        ]],
        [[ alternateMode-r11           ENUMERATED {true}    OPTIONAL    -- Need ON
        ]]
    }
}
```

SPS-Config field descriptions
<text omited>
alternateMode
The first HARQ information is stored when the UE receives PDCCH which contains the SPS activation. The second HARQ information is stored when the UE receives the PDCCH which contains the SPS second activation. The first and the second stored information are applied alternatively to recuring configured transmissions.

Activation of the second HARQ information can be signaled over the PDCCH as the second activation. The second activation is defined in section 9.2 of 3GPP TS 36.213. Examples of revisions that could be made to that section in order to implement the concepts described herein are shown in an embodiment of the disclosure below.

9.2 PDCCH Validation for Semi-Persistent Scheduling
A UE shall validate a Semi-Persistent Scheduling assignment PDCCH only if all the following conditions are met:
   the CRC parity bits obtained for the PDCCH payload are scrambled with the Semi-Persistent Scheduling C-RNTI
   the new data indicator field is set to '0'. In case of DCI formats 2, 2A, 2B and 2C, the new data indicator field refers to the one for the enabled transport block.
Validation is achieved if all the fields for the respective used DCI format are set according to Table 9.2-1 or Table 9.2-1A or Table 9.2-1B.
If validation is achieved, the UE shall consider the received DCI information accordingly as a valid semi-persistent activation, second activation or release.
If validation is not achieved, the received DCI format shall be considered by the UE as having been received with a non-matching CRC.

TABLE 9.2-1B

Special fields for Semi-Persistent Scheduling
Second Activation PDCCH Validation

|  | DCI format 1/1A | DCI format 2/2A/2B/2C |
|---|---|---|
| TPC command for scheduled PUSCH | [2] N/A | [3] N/A |
| Cyclic shift DM RS | N/A | N/A |
| Modulation and coding scheme and redundancy version | N/A | N/A |
| HARQ process number | FDD: set to '111' TDD: set to '1111' | [4] FDD: set to '111' TDD: set to '1111' |
| Modulation and coding scheme | MSB is set to '0' | For the enabled transport block: MSB is set to '0' |

TABLE 9.2-1

Special fields for Semi-Persistent Scheduling Activation PDCCH Validation

|  | DCI format 0 | DCI format 1/1A | DCI format 2/2A/2B/2C |
|---|---|---|---|
| TPC command for scheduled PUSCH | [1] set to '00' | [2] N/A | [3] N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | [4] FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

<text omitted>

TABLE 9.2-1B-continued

Special fields for Semi-Persistent Scheduling
Second Activation PDCCH Validation

| | DCI format 1/1A | DCI format 2/2A/2B/2C |
|---|---|---|
| Redundancy version | set to '00' | For the enabled transport block: set to '00' |

UE MAC second activation behavior can be implemented as shown in an embodiment of the disclosure below.

5.3.1 DL Assignment Reception

Downlink assignments transmitted on the PDCCH indicate if there is a transmission on a DL-SCH for a particular UE and provide the relevant HARQ information.

When the UE has a C-RNTI, Semi-Persistent Scheduling C-RNTI, or Temporary C-RNTI, the UE shall for each TTI during which it monitors PDCCH and for each Serving Cell:
    if a downlink assignment for this TTI and this Serving Cell has been received on the PDCCH for the UE's C-RNTI, or Temporary C-RNTI:
        if this is the first downlink assignment for this Temporary C-RNTI:
            consider the NDI to have been toggled.
        if the downlink assignment is for UE's C-RNTI and if the previous downlink assignment indicated to the HARQ entity of the same HARQ process was either a downlink assignment received for the UE's Semi-Persistent Scheduling C-RNTI or a configured downlink assignment:
            consider the NDI to have been toggled regardless of the value of the NDI.
        indicate the presence of a downlink assignment and deliver the associated HARQ information to the HARQ entity for this TTI.
    else, if this Serving Cell is the PCell and a downlink assignment for this TTI has been received for the PCell on the PDCCH of the PCell for the UE's Semi-Persistent Scheduling C-RNTI:
        if the NDI in the received HARQ information is 1:
            consider the NDI not to have been toggled;
            indicate the presence of a downlink assignment and deliver the associated HARQ information to the HARQ entity for this TTI.
        else, if the NDI in the received HARQ information is 0:
            if PDCCH contents indicate SPS release:
                clear the configured downlink assignment (if any);
                if timeAlignmentTimer is running:
                    indicate a positive acknowledgement for the downlink SPS release to the physical layer.
            else:
                store the downlink assignment and the associated HARQ information as configured downlink assignment according to rules in subclause 5.10.1;
                if alternateMode is not indicated:
                    initialise (if not active) or re-initialise (if already active) the configured downlink assignment to start in this TTI and to recur according to rules in subclause 5.10.1;
                else, if PDCCH contents indicate SPS activation:
                    initialise (if not active) or re-initialise (if already active) the configured downlink assignment to start in this TTI and to recur according to rules in subclause 5.10.1;
                else, (if PDCCH contents indicate SPS second activation):
                    initialise (if not active) or re-initialise (if already active) the configured downlink assignment to recur according to rules in subclause 5.10.1;
                  set the HARQ Process ID to the HARQ Process ID associated with this TTI;
                    consider the NDI bit to have been toggled;
                    indicate the presence of a configured downlink assignment and deliver the stored HARQ information to the HARQ entity for this TTI.
    else, if this Serving Cell is the PCell and a downlink assignment for this TTI has been configured for the PCell and there is no measurement gap in this TTI; and
    if this TTI is not an MBSFN subframe of the PCell or the UE is configured with transmission mode tm9 on the PCell:
        instruct the physical layer to receive, in this TTI, transport block on the DL-SCH according to the configured downlink assignment and to deliver it to the HARQ entity;
        set the HARQ Process ID to the HARQ Process ID associated with this TTI;
        consider the NDI bit to have been toggled;
        indicate the presence of a configured downlink assignment and deliver the stored HARQ information to the HARQ entity for this TTI.

For configured downlink assignments, the HARQ Process ID associated with this TTI is derived from the following equation:

$$\text{HARQ Process ID} = [\text{floor}(\text{CURRENT\_TTI}/\text{semiPersistSchedIntervalDL})] \bmod \text{numberOfConfSPS-Processes},$$

where $\text{CURRENT\_TTI} = [(\text{SFN}*10) + \text{subframe number}]$.

<text omitted>

5.10 Semi-Persistent Scheduling

When Semi-Persistent Scheduling is enabled by RRC, the following information is provided [8]:
    Semi-Persistent Scheduling C-RNTI;
    Uplink Semi-Persistent Scheduling interval semiPersistSchedIntervalUL and number of empty transmissions before implicit release implicitReleaseAfter, if Semi-Persistent Scheduling is enabled for the uplink;
    Whether twoIntervalsConfig is enabled or disabled for uplink, only for TDD;
    Downlink Semi-Persistent Scheduling interval semiPersistSchedIntervalDL, number of configured HARQ processes for Semi-Persistent Scheduling numberOfConfSPS-Processes and alternateMode, if Semi-Persistent Scheduling is enabled for the downlink;

When Semi-Persistent Scheduling for uplink or downlink is disabled by RRC, the corresponding configured grant or configured assignment shall be discarded.

Semi-Persistent Scheduling is supported on the PCell only.

Semi-Persistent Scheduling is not supported for RN communication with the E-UTRAN in combination with an RN subframe configuration.

5.10.1 Downlink

After a Semi-Persistent downlink assignment is configured when alternateMode is not indicated, the UE shall consider that the assignment recurs in each subframe for which:

$$(10*\text{SFN} + \text{subframe}) = [(10*\text{SFN}_{start\ time} + \text{subframe}_{start\ time}) + N*\text{semiPersistSchedIntervalDL}] \bmod 10240,$$
for all $N > 0$.

Where $SFN_{start\ time}$ and $subframe_{start\ time}$ are the SFN and subframe, respectively, at the time the configured downlink assignment were (re-)initialised.

When alternateMode is indicated, after a Semi-Persistent downlink assignment is configured by SPS activation the UE shall consider that the assignment recurs in each subframe for which:

(10*SFN+subframe)=[(10*$SFN_{start\ time}$+
    $subframe_{start\ time}$)+
    N*semiPersistSchedIntervalDL*2] modulo
    10240, for all N>0.

Where $SFN_{start\ time}$ and $subframe_{start\ time}$ are the SFN and subframe, respectively, at the time the configured downlink assignment were (re-)initialised by SPS activation.

When alternateMode is indicated, after a Semi-Persistent downlink assignment is configured by SPS second activation the UE shall consider that the assignment recurs in each subframe for which:

(10*SFN+subframe)=[(10*$SFN_{start\ time}$+
    $subframe_{start\ time}$)+
    N*semiPersistSchedIntervalDL*2+semiPersistSchedIntervalDL] modulo 10240, for all
    N>=0.

Where $SFN_{start\ time}$ and $subframe_{start\ time}$ are the SFN and subframe, respectively, at the time the configured downlink assignment were (re-)initialised by SPS activation.

Alternatively, a 40 ms SPS interval solution can be implemented in the SPS configuration ASN.1 definition as shown in an embodiment of the disclosure below.

estimation (csi-SubframePatternConfig), but the UE maintains (measSubframePatternConfigNeigh). The target eNB handling the reestablishment may configure measSubframePatternPCell and SubframePatternConfig by a RRCConnectionReestablishment message if they are applicable to the UE. After the reestablishment, the eNB may also reconfigure measSubframePatternConfig Neigh by a RRCConnectionReconfiguraiton message if reconfiguration is required. On the other hand, in the case of a handover, the target eNB may reconfigure all three subframe patterns by one reconfiguration message (handover command).

The idea of parallel message transmission at reestablishment has previously been discussed, and it has been agreed that Rel-8/9 UEs are not required to support parallel message reception during reestablishment. Rel-10 behavior has not been specified. If parallel transmission is supported in Rel-10, the RRCConnectionReconfiguraiton message may be sent at the same time as the RRCConnectionReestablishment message. Therefore, there may be a processing delay of the reestablishment message before measSubframePatternConfigNeigh may be reconfigured if such reconfiguration is required and the eNB transmits the reestablishment and reconfiguration messages at the same time. Otherwise, reconfiguration of measSubframePatternConfigNeigh may be further delayed. Regardless of future specifications of Rel-10 behavior, an issue caused by late reconfiguration of measSubframePatternConfigNeigh may need to be settled. In some cases, the network may not transmit the two messages in parallel.

| SPS-Config field descriptions |
| --- |
| implicitReleaseAfter |
| Number of empty transmissions before implicit release, see TS 36.321 [6, 5.10.2]. Value e2 corresponds to 2 transmissions, e3 corresponds to 3 transmissions and so on. |
| n1PUCCH-AN-PersistentList, n1PUCCH-AN-PersistentListP1 |
| List of parameter: $n_{PUCCH}^{(1,p)}$ for antenna port P0 and for antenna port P1 respectively, see TS 36.213 [23, 10.1]. Field n1-PUCCH-AN-PersistentListP1 is applicable only if the twoAntennaPortActivatedPUCCH-Format1a1b in PUCCH-ConfigDedicated-v1020 is set to true. Otherwise the field is not configured. |
| numberOfConfSPS-Processes |
| The number of configured HARQ processes for Semi-Persistent Scheduling, see TS 36.321 [6]. |
| p0-NominalPUSCH-Persistent |
| Parameter: $P_{O\_NOMINAL\_PUSCH}(0)$. See TS 36.213 [23, 5.1.1.1], unit dBm step 1. This field is applicable for persistent scheduling, only. If choice setup is used and p0-Persistent is absent, apply the value of p0-NominalPUSCH for p0-NominalPUSCH-Persistent. |
| p0-UE-PUSCH-Persistent |
| Parameter: $P_{O\_UE\_PUSCH}(0)$. See TS 36.213 [23, 5.1.1.1], unit dB. This field is applicable for persistent scheduling, only. If choice setup is used and p0-Persistent is absent, apply the value of p0-UE-PUSCH for p0-UE-PUSCH-Persistent. |
| semiPersistSchedC-RNTI |
| Semi-persistent Scheduling C-RNTI, see TS 36.321 [6]. |
| semiPersistSchedIntervalDL |
| Semi-persistent scheduling interval in downlink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames. When ABS subframes are used, semiPersistSchedIntervalDL should be set to sf(5 * $2^n$) where n = 3, 4 ... 7. |
| semiPersistSchedIntervalUL |
| Semi-persistent scheduling interval in uplink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames. |
| twoIntervalsConfig |
| Trigger of two-intervals-Semi-Persistent Scheduling in uplink. See TS 36.321 [6, 5.10]. If this field is present, two-intervals-SPS is enabled for uplink. Otherwise, two-intervals-SPS is disabled. |

Additional discussion will now be provided regarding an issue with the handling of measSubframePatternConfigNeigh upon reestablishment.

Upon initialization of RRC connection reestablishment, the UE releases the time domain measurement resource restriction for PCell (measSubframePatternPCell) and CSI Suppose that the UE was configured with measSubframePatternConfigNeigh for frequency layer f1 and was then handed over to the frequency f2 and experienced radio link failure. Upon reestablishment, the UE selects a cell on f1 and restarts to apply the measSubframePatternConfigNeigh. Current procedures may allow a maintained measurement resource restriction to be applied upon reestablishment before the subsequent measurement reconfiguration. The maintained measurement restriction may be improper due to UE mobility. measSubframePatternConfigNeigh includes the actual subframe pattern (measSubframePatternNeigh) and a list of the physical cell identities (measSubframeCellList) to which the subframe pattern is applied. Therefore, an improper pattern could be applied to unintended target cells whose physical cell identities are the same as the original target cells (PCI confusion).

If the target eNB identifies a need to reconfigure measSubframePatternConfigNeigh, the target eNB will perform measurement reconfiguration. However, due to bad radio conditions or high loading of the target eNB, the measurement reconfiguration may be delayed. In such case, it may take a long time before the layer 3 filter in the UE stabilizes and produces proper layer 3 measurements for event evaluation. In a worst case scenario, an incorrect event may be triggered.

In an embodiment, in order to eliminate the risk of an incorrect handover or to improve mobility handling in a HetNet deployment scenario, a UE releases measSubframePatternConfigNeigh upon reestablishment if the UE was configured with measSubframePatternConfigNeigh for the target primary frequency. There may be a case where the same measSubframePatternConfigNeigh can be applicable to the target cell after reestablishment. However, such a case may be rare because measSubframeCellList is likely to be different in the target cell.

Figure 11:
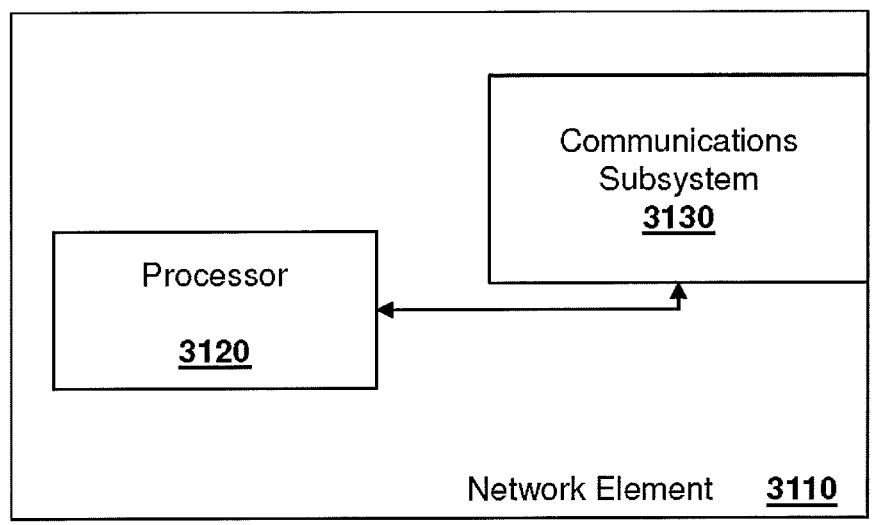
FIG. 11 is a simplified block diagram of an exemplary network element according to one embodiment.

The concepts described above may be implemented by a network element. A simplified network element is shown with regard to FIG. 11. In FIG. 11, network element 3110 includes a processor 3120 and a communications subsystem 3130, where the processor 3120 and communications subsystem 3130 cooperate to perform the methods described above.

Further, the above may be implemented by a UE. One exemplary device is described below with regard to FIG. 12. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

Figure 12:
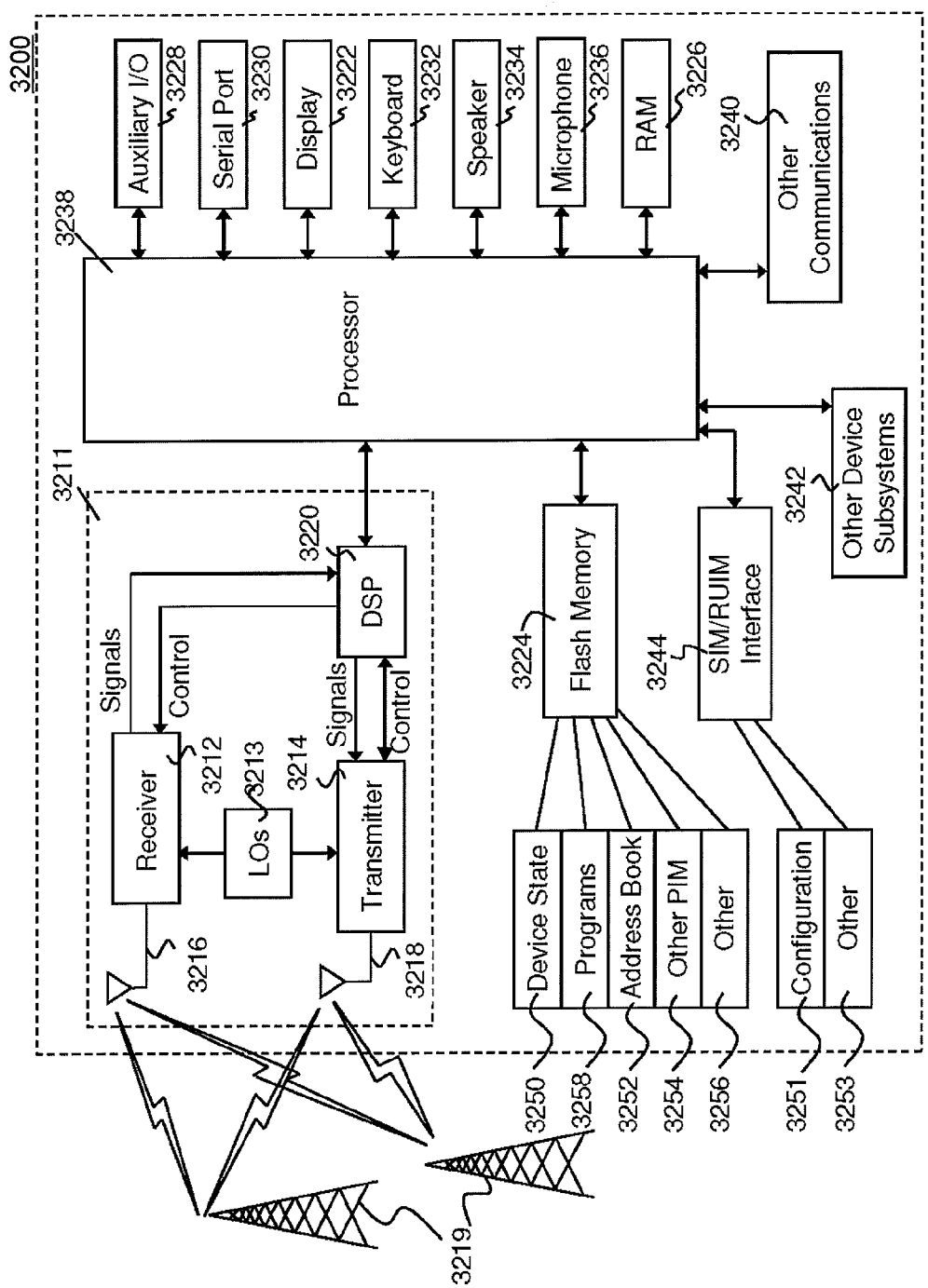
FIG. 12 is a block diagram with an example user equipment capable of being used with the systems and methods in the embodiments described herein.

When required network registration or activation procedures have been completed, UE 3200 may send and receive communication signals over the network 3219. As illustrated in FIG. 12, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 could include a USB port or other port known to those in the art.

Some of the subsystems shown in FIG. 12 perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 in FIG. 12 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

Figure 13:
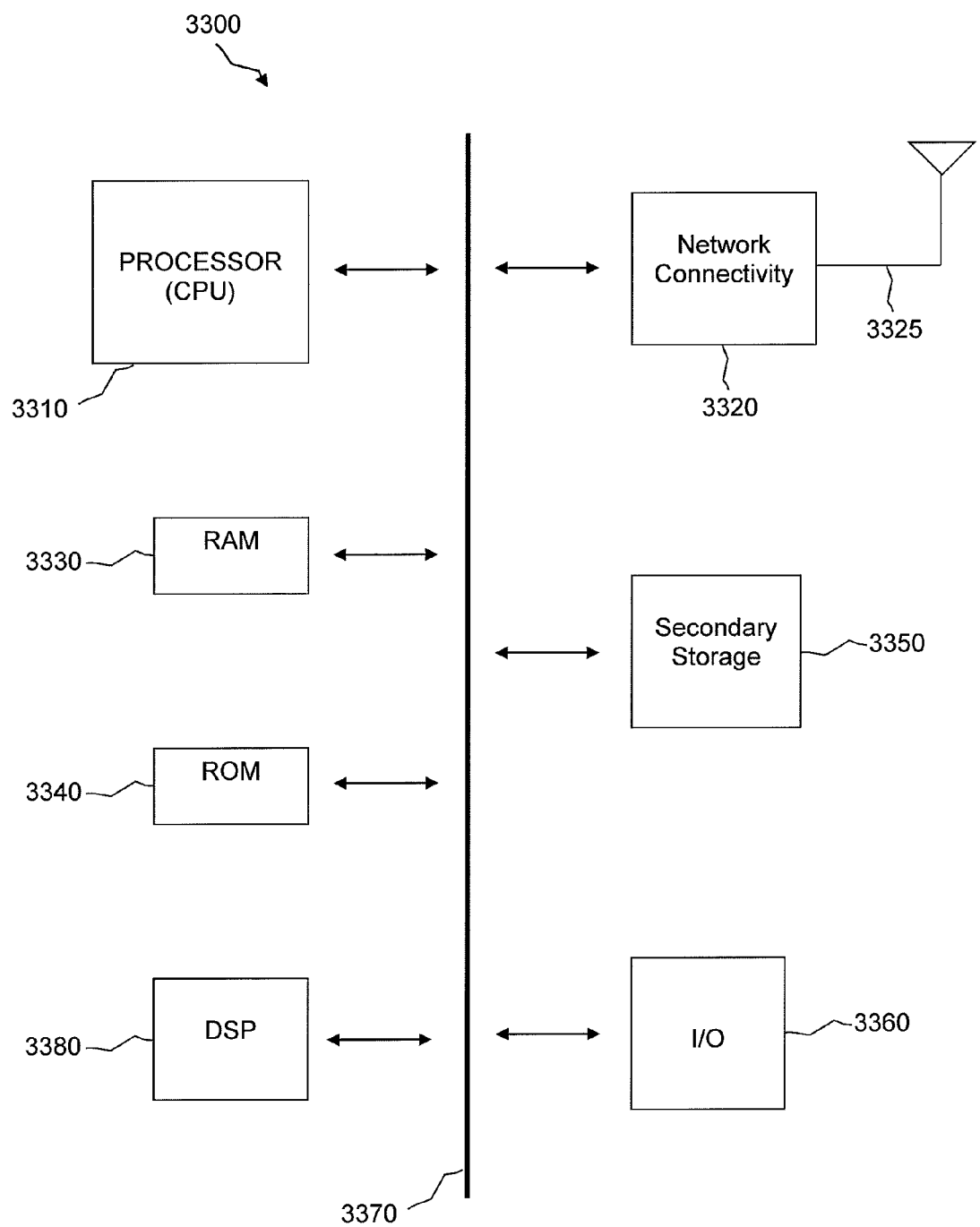
FIG. 13 illustrates a processor and related components suitable for implementing the several embodiments of the present disclosure.

The UE and other components described above might include a processing component that is capable of executing instructions related to the actions described above. FIG. 13 illustrates an example of a system 3300 that includes a processing component 3310 suitable for implementing one or more embodiments disclosed herein. The processing component 3310 may be substantially similar to the processor 3120 of FIG. 11 and/or the processor 3238 of FIG. 12.

In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

In an embodiment, a method is provided for operating a network element in a wireless communications network. The method comprises transmitting, by a network element configured to utilize time domain measurement resource restriction, a first initial transmission under an SPS scheme, wherein retransmissions of the first initial transmission follow a first retransmission pattern that is aligned with a restricted subframe pattern. The method further comprises transmitting, by the network element, a second initial transmission under the SPS scheme, wherein retransmissions of the second initial transmission follow a second retransmission pattern, the second retransmission pattern allowing at least one retransmission of the second initial transmission to occur in a restricted subframe.

In another embodiment, a network element in a wireless communications network is provided. The network element comprises a processor configured such that a network element configured to utilize time domain measurement resource restriction transmits a first initial transmission under an SPS scheme, wherein retransmissions of the first initial transmission follow a first retransmission pattern that is aligned with a restricted subframe pattern. The processor is further configured such that the network element transmits a second initial transmission under the SPS scheme, wherein retransmissions of the second initial transmission follow a second retransmission pattern, wherein the second retransmission pattern allows at least one retransmission of the second initial transmission to occur in a restricted subframe.

In another embodiment, a method is provided for operating a network element in a wireless communications network. The method comprises transmitting, by the network element, configured to utilize time domain measurement resource restriction, a first initial transmission under an SPS scheme. The method further comprises transmitting, by the network element, a second initial transmission under the SPS scheme. The first initial transmissions and second initial transmissions occur every 40 subframes. A retransmission of the first initial transmission occurs at least once 8 subframes after the first initial transmission, and a retransmission of the second initial transmission occurs at least once 8 subframes after the second initial transmission. The retransmissions of the first initial transmission and the second initial transmission are aligned with a restricted subframe pattern.

In another embodiment, a network element in a wireless communications network is provided. The network element comprises a processor configured such that the network element, configured to utilize time domain measurement resource restriction, transmits a first initial transmission under a semi-persistent scheduling (SPS) scheme. The processor is further configured such that the network element transmits a second initial transmission under the SPS scheme. The first initial transmissions and second initial transmissions occur every 40 subframes. A retransmission of the first initial transmission occurs at least once 8 subframes after the first initial transmission, and a retransmission of the second initial transmission occurs at least once 8 subframes after the second initial transmission. The retransmissions of the first initial transmission and the second initial transmission are aligned with a restricted subframe pattern.

In another embodiment, a method is provided for operating a network element in a wireless communications network. The method comprises transmitting, by the network element, configured to utilize time domain measurement resource restriction, an initial transmission under an SPS scheme. The initial transmissions occur every 20 subframes. A retransmission of an initial transmission occurs at least once 10 subframes after the first initial transmission. The retransmissions of the initial transmission are aligned with restricted subframes that occur in a 1/10 pattern.

In another embodiment, a network element in a wireless communications network is provided. The network element comprises a processor configured such that the network element, configured to utilize time domain measurement resource restriction, transmits an initial transmission under an SPS scheme. The initial transmissions occur every 20 subframes. A retransmission of an initial transmission occurs at least once 10 subframes after the first initial transmission. The retransmissions of the initial transmission are aligned with restricted subframes that occur in a 1/10 pattern.

In another embodiment, a method is provided for operating a UE in a wireless communications network. The method comprises receiving, by the UE, a first initial transmission under an SPS scheme, wherein retransmissions of the first initial transmission follow a first retransmission pattern. The method further comprises receiving, by the UE, a second initial transmission under the SPS scheme, wherein retransmissions of the second initial transmission follow a second retransmission pattern, the second retransmission pattern allowing at least one retransmission of the second initial transmission to occur in a restricted subframe.

In another embodiment, a UE is provided. The UE comprises a processor configured such that the UE receives a first initial transmission under an SPS scheme, wherein retransmissions of the first initial transmission follow a first retransmission pattern. The processor is further configured such that the UE receives a second initial transmission under the SPS scheme, wherein retransmissions of the second initial transmission follow a second retransmission pattern, the second retransmission pattern allowing at least one retransmission of the second initial transmission to occur in a restricted subframe.

In another embodiment, a method is provided for operating an underlay network element in a wireless heterogeneous network including an overlay network element. The method comprises receiving, by the underlay network element, a pattern signifying subframes in which a transmission power of the overlay network element will be reduced. The method further comprises transmitting, by the underlay network element, a first packet comprising a value. The method further comprises transmitting, by the underlay network element, a second packet comprising the value in one of the signified subframes.

The following are incorporated herein by reference for all purposes: 3GPP TS 36.213 version 10.3.0, 3GPP TS 36.300 version 10.5.0, 3GPP TS 36.304 version 10.3.0, 3GPP TS 36.321 version 10.3.0, and 3GPP TS 36.331 version 10.3.0.

The present disclosure provides illustrative implementations of one or more embodiments. The disclosure should in no way be limited to the illustrative implementations, drawings, and techniques illustrated below, including the exemplary designs and implementations illustrated and described herein, but may be modified within the scope of the appended claims along with their full scope of equivalents. A person of skill in the relevant art will recognized that the disclosed systems and/or methods may be implemented using any number of techniques, whether currently known or in existence. Embodiments are described herein in the context of an LTE wireless network or system, but can be adapted for other wireless networks or systems.

This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

---

Text Box 1

---

MeasSubframePattern
The IE MeasSubframePattern is used to specify time domain measurement resource restriction. The first/leftmost bit corresponds to the subframe #0 of the radio frame satisfying SFN mod x = 0, where SFN is that of PCell and x is the size of the bit string divided by 10. "1" denotes that the corresponding subframe is used for measurement.
MeasSubframePattern information element
-- ASN1START
MeasSubframePattern-r10 ::= CHOICE {
   subframePatternFDD-r10            BIT STRING (SIZE (40)),
   subframePatternTDD-r10            CHOICE {
      subframeConfig1-5-r10         BIT STRING (SIZE (20)),
      subframeConfig0-r10           BIT STRING (SIZE (70)),
      subframeConfig6-r10           BIT STRING (SIZE (60)),
      ...
   },
   ...
}

---

Text Box 2

---

Figure 4:
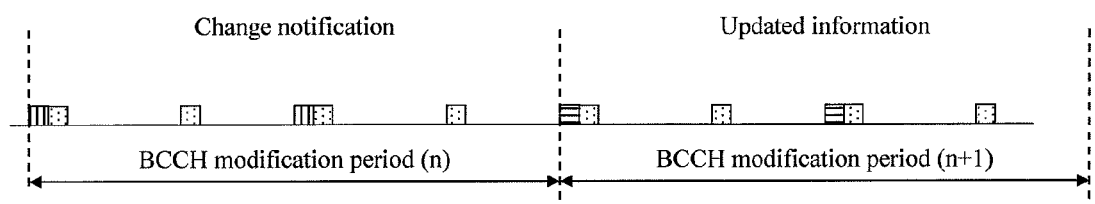
FIG. 4 is a diagram of notification of changes in system information.

5.2.1.3 System information validity and notification of changes
Change of system information (other than for ETWS and CMAS) only occurs at specific radio frames, i.e. the concept of a modification period is used. System information may be transmitted a number of times with the same content within a modification period, as defined by its scheduling. The modification period boundaries are defined by SFN values for which SFN mod m = 0, where m is the number of radio frames comprising the modification period. The modification period is configured by system information.
When the network changes (some of the) system information, it first notifies the UEs about this change, i.e. this may be done throughout a modification period. In the next modification period, the network transmits the updated system information. These general principles are illustrated in FIG. 4, in which different types of shading indicate different system information. Upon receiving a change notification, the UE acquires the new system information immediately from the start of the next modification period. The UE applies the previously acquired system information until the UE acquires the new system information.
The Paging message is used to inform UEs in RRC_IDLE and UEs in RRC_CONNECTED about a system information change. If the UE receives a Paging message including the systemInfoModification, it knows that the system information will change at the next modification period boundary. Although the UE may be informed about changes in system information, no further details are provided e.g. regarding which system information will change.
SystemInformationBlockType1 includes a value tag, systemInfoValueTag, that indicates if a change has occurred in the SI messages. UEs may use systemInfoValueTag, e.g. upon return from out of coverage, to verify if the previously stored SI messages are still valid. Additionally, the UE considers stored system information to be invalid after 3 hours from the moment it was successfully confirmed as valid, unless specified otherwise.
E-UTRAN may not update systemInfoValueTag upon change of some system information e.g. ETWS information, CMAS information, regularly changing parameters like CDMA2000 system time (see 6.3). Similarly, E-UTRAN may not include the systemInfoModification within the Paging message upon change of some system information.
The UE verifies that stored system information remains valid by either checking systemInfoValueTag in SystemInformationBlockType1 after the modification period boundary, or attempting to find the systemInfoModification indication at least modificationPeriodCoeff times during the modification period in case no paging is received, in every modification period. If no paging message is received by the UE during a modification period, the UE may assume that no change of system information will occur at the next modification period boundary. If UE in RRC_CONNECTED, during a modification period, receives one paging message, it may deduce from the presence/absence of systemInfoModification whether a change of system information other than ETWS and CMAS information will occur in the next modification period or not.
ETWS and/or CMAS capable UEs in RRC_CONNECTED shall attempt to read paging at least once every defaultPagingCycle to check whether ETWS and/or CMAS notification is present or not.
5.2.1.4 Indication of ETWS notification
ETWS primary notification and/or ETWS secondary notification can occur at any point in time. The Paging message is used to inform ETWS capable UEs in RRC_IDLE and UEs in RRC_CONNECTED about presence of an ETWS primary notification and/or ETWS secondary notification. If the UE receives a Paging message

Text Box 2 including the etws-Indication, it shall start receiving the ETWS primary notification and/ or ETWS secondary notification according to schedulingInfoList contained in SystemInformationBlockType1.
<Text omitted>
5.2.1.5 Indication of CMAS notification
CMAS notification can occur at any point in time. The Paging message is used to inform CMAS capable UEs in RRC_IDLE and UEs in RRC_CONNECTED about presence of one or more CMAS notifications. If the UE receives a Paging message including the cmas-Indication, it shall start receiving the CMAS notifications according to schedulingInfoList contained in SystemInformationBlockType1.
<Text omitted>

Text Box 3

7 PAGING
7.1 Discontinuous Reception for paging
The UE may use Discontinuous Reception (DRX) in idle mode in order to reduce power consumption. One Paging Occasion (PO) is a subframe where there may be P-RNTI transmitted on PDCCH addressing the paging message. One Paging Frame (PF) is one Radio Frame, which may contain one or multiple Paging Occasion(s). When DRX is used the UE needs only to monitor one PO per DRX cycle.
PF and PO is determined by following formulae using the DRX parameters provided in System Information:
  PF is given by following equation:
    SFN mod T = (T div N)*(UE_ID mod N)
  Index i_s pointing to PO from subframe pattern defined in 7.2 will be derived from following calculation:
    i_s = floor(UE_ID/N) mod Ns
System Information DRX parameters stored in the UE shall be updated locally in the UE whenever the DRX parameter values are changed in SI. If the UE has no IMSI, for instance when making an emergency call without USIM, the UE shall use as default identity UE_ID = 0 in the PF and i_s formulas above.
The following Parameters are used for the calculation of the PF and i_s:
  T: DRX cycle of the UE. T is determined by the shortest of the UE specific DRX value, if allocated by upper layers, and a default DRX value broadcast in system information. If UE specific DRX is not configured by upper layers, the default value is applied.
  nB: 4T, 2T, T, T/2, T/4, T/8, T/16, T/32.
  N: min(T, nB)
  Ns: max(1, nB/T)
  UE_ID: IMSI mod 1024.
IMSI is given as sequence of digits of type Integer (0 . . . 9), IMSI shall in the formulae above be interpreted as a decimal integer number, where the first digit given in the sequence represents the highest order digit.
For example:
    IMSI = 12 (digit1 = 1, digit2 = 2)
In the calculations, this shall be interpreted as the decimal integer "12", not "1 × 16 + 2 = 18".

7.2 Subframe Patterns

| Ns | PO when i_s = 0 | PO when i_s = 1 | PO when i_s = 2 | PO when i_s = 3 |
|---|---|---|---|---|
| FDD: | | | | |
| 1 | 9 | N/A | N/A | N/A |
| 2 | 4 | 9 | N/A | N/A |
| 4 | 0 | 4 | 5 | 9 |
| TDD (all UL/DL configurations): | | | | |
| 1 | 0 | N/A | N/A | N/A |
| 2 | 0 | 5 | N/A | N/A |
| 4 | 0 | 1 | 5 | 6 |

Text Box 4

RadioResourceConfigCommon
The IE RadioResourceConfigCommonSIB and IE RadioResourceConfigCommon are used to specify common radio resource configurations in the system information and in the mobility control information, respectively, e.g., the random access parameters and the static physical layer parameters.
RadioResourceConfigCommon information element
-- ASN1START
RadioResourceConfigCommonSIB ::=    SEQUENCE {
    rach-ConfigCommon           RACH-ConfigCommon,
    bcch-Config                 BCCH-Config,
    pcch-Config                 PCCH-Config,
    prach-Config                PRACH-ConfigSIB,
    pdsch-ConfigCommon          PDSCH-ConfigCommon,
    pusch-ConfigCommon          PUSCH-ConfigCommon,
    pucch-ConfigCommon          PUCCH-ConfigCommon,
    soundingRS-UL-ConfigCommon  SoundingRS-UL-ConfigCommon,
    uplinkPowerControlCommon    UplinkPowerControlCommon,
    ul-CyclicPrefixLength       UL-CyclicPrefixLength,
    ...,
    [[ uplinkPowerControlCommon-v1020  UplinkPowerControlCommon-v1020    OPTIONAL    -- Need OR
    ]]
}
<text omited>
BCCH-Config ::=    SEQUENCE {
    modificationPeriodCoeff     ENUMERATED {n2, n4, n8, n16}
}

Text Box 4

```
PCCH-Config ::=            SEQUENCE {
    defaultPagingCycle         ENUMERATED {
                                   rf32, rf64, rf128, rf256},
    nB                         ENUMERATED {
                                   fourT, twoT, oneT, halfT, quarterT, oneEighthT,
                                   oneSixteenthT, oneThirtySecondT}
}
``` defaultPagingCycle
Default paging cycle, used to derive 'T' in TS 36.304. Value rf32 corresponds to 32 radio frames, rf64 corresponds to 64 radio frames and so on.
modificationPeriodCoeff
Actual modification period, expressed in number of radio frames= modificationPeriodCoeff* defaultPagingCycle. n2 corresponds to value 2, n4 corresponds to value 4, n8 corresponds to value 8 and n16 corresponds to value 16.
nB
Parameter: nB is used as one of parameters to derive the Paging Frame and Paging Occasion according to TS 36.304. Value in multiples of 'T' as defined in TS 36.304 [4]. A value of fourT corresponds to 4 * T, a value of twoT corresponds to 2 * T and so on.

Text Box 5

5.5 PCH reception
When the UE needs to receive PCH, the UE shall:
    if a PCH assignment has been received on the PDCCH of the PCell for the P-RNTI:
        attempt to decode the TB on the PCH as indicated by the PDCCH information.
    if a TB on the PCH has been successfully decoded:
        deliver the decoded MAC PDU to upper layers.
  <text omited>
5.7 Discontinuous Reception (DRX)
The UE may be configured by RRC with a DRX functionality that controls the UE's PDCCH monitoring activity for the UE's C-RNTI, TPC-PUCCH-RNTI, TPC-PUSCH-RNTI and Semi-Persistent Scheduling C-RNTI (if configured). When in RRC_CONNECTED, if DRX is configured, the UE is allowed to monitor the PDCCH discontinuously using the DRX operation specified in this subclause; otherwise the UE monitors the PDCCH continuously. When using DRX operation, the UE shall also monitor PDCCH according to requirements found in other subclauses of this specification. RRC controls DRX operation by configuring the timers onDurationTimer, drx-InactivityTimer, drx-RetransmissionTimer (one per DL HARQ process except for the broadcast process), the longDRX-Cycle, the value of the drxStartOffset and optionally the drxShortCycleTimer and shortDRX-Cycle. A HARQ RTT timer per DL HARQ process (except for the broadcast process) is also defined (see subclause 7.7).
When a DRX cycle is configured, the Active Time includes the time while:
    onDurationTimer or drx-InactivityTimer or drx-RetransmissionTimer or mac-ContentionResolutionTimer (as described in subclause 5.1.5) is running; or
    a Scheduling Request is sent on PUCCH and is pending (as described in subclause 5.4.4); or
    an uplink grant for a pending HARQ retransmission can occur and there is data in the corresponding HARQ buffer; or
    a PDCCH indicating a new transmission addressed to the C-RNTI of the UE has not been received after successful reception of a Random Access Response for the preamble not selected by the UE (as described in subclause 5.1.4).
When DRX is configured, the UE shall for each subframe:
    if a HARQ RTT Timer expires in this subframe and the data in the soft buffer of the corresponding HARQ process was not successfully decoded:
        start the drx-RetransmissionTimer for the corresponding HARQ process.
    if a DRX Command MAC control element is received:
        stop onDurationTimer;
        stop drx-InactivityTimer.
    if drx-InactivityTimer expires or a DRX Command MAC control element is received in this subframe:
        if the Short DRX cycle is configured:
            start or restart drxShortCycleTimer;
            use the Short DRX Cycle.
        else:
            use the Long DRX cycle.
    if drxShortCycleTimer expires in this subframe:
        use the Long DRX cycle.
    If the Short DRX Cycle is used and [(SFN * 10) + subframe number] modulo (shortDRX-Cycle) = (drxStartOffset) modulo (shortDRX-Cycle); or
    if the Long DRX Cycle is used and [(SFN * 10) + subframe number] modulo (longDRX-Cycle) = drxStartOffset:
        start onDurationTimer.
    during the Active Time, for a PDCCH-subframe, if the subframe is not required for uplink transmission for half-duplex FDD UE operation and if the subframe is not part of a configured measurement gap:
        monitor the PDCCH;
        if the PDCCH indicates a DL transmission or if a DL assignment has been configured for this subframe:
            start the HARQ RTT Timer for the corresponding HARQ process;

-continued

Text Box 5 stop the drx-RetransmissionTimer for the corresponding HARQ process.
if the PDCCH indicates a new transmission (DL or UL):
    start or restart drx-InactivityTimer.
when not in Active Time, type-0-triggered SRS [2] shall not be reported.
if CQI masking (cqi-Mask) is setup by upper layers:
    when onDurationTimer is not running, CQI/PMI/RI/PTI on PUCCH shall not be reported.
else:
    when not in Active Time, CQI/PMI/RI/PTI on PUCCH shall not be reported.
Regardless of whether the UE is monitoring PDCCH or not, the UE receives and transmits HARQ feedback and transmits type-1-triggered SRS [2] when such is expected.

NOTE:
A UE may optionally choose to not send CQI/PMI/RI/PTI reports on PUCCH and/or type-0-triggered SRS transmissions for up to 4 subframes following a PDCCH indicating a new transmission (UL or DL) received in the last subframe of active time. The choice not to send CQI/PMI/RI/PTI reports on PUCCH and/or type-0-triggered SRS transmissions is not applicable for subframes where onDurationTimer is running.
NOTE:
The same active time applies to all activated serving cell(s).

What is claimed is:

1. A method for operating a network element in a wireless communications network, the method comprising:
   transmitting, by a network element configured to utilize time domain measurement resource restriction to mitigate interference, a first initial transmission under a semi-persistent scheduling (SPS) scheme, wherein retransmissions of the first initial transmission follow a first retransmission pattern that is aligned with a restricted subframe pattern; and
   transmitting, by the network element, a second initial transmission under the SPS scheme, wherein retransmissions of the second initial transmission follow a second retransmission pattern, the second retransmission pattern allowing at least one retransmission of the second initial transmission to occur in a restricted subframe,
   wherein retransmissions in the first retransmission pattern occur every fixed number of subframes and coincide with restricted subframes, and wherein the at least one retransmission of the second initial transmission occurs a predetermined number of subframes later than the second initial transmission, the predetermined number being different than the fixed number.

2. The method of claim 1, further comprising adjusting, by a scheduler in the network element, the second retransmission pattern to align the at least one retransmission of the second initial transmission to the restricted subframe.

3. The method of claim 1, wherein restricted subframes occur at least in a 1/8 pattern, wherein initial transmissions occur every 20 subframes, wherein the fixed number of subframes is equal to 8 subframes, and wherein the predetermined number of subframes is equal to twelve subframes.

4. The method of claim 1, wherein restricted subframes occur at least in a 1/8 pattern, wherein a first set of initial transmissions and a second set of initial transmissions each occur every 40 subframes with a 24 subframe offset between the first set of initial transmissions and the second set of initial transmissions, and wherein retransmissions occur every 8 subframes and coincide with restricted subframes.

5. The method of claim 4, wherein the number of retransmissions of the second initial transmission is limited to one.

6. The method of claim 1, wherein restricted subframes do not occur in a 1/8 pattern, and wherein initial transmissions and retransmissions align with restricted subframes.

7. The method of claim 6, wherein initial transmissions occur every 20 subframes, wherein retransmissions occur 8 subframes after an initial retransmission or a previous retransmission, and wherein restricted subframes are aligned with initial transmissions or retransmissions.

8. The method of claim 1, further comprising the network element activating, reactivating, or releasing SPS in a restricted subframe protected from interference.

9. The method of claim 1, further comprising using, by the network element, a more robust modulation and coding scheme for transmitting data packets in the second initial transmission and retransmissions of the second initial transmission than the network element uses for transmitting data packets in the first initial transmission and retransmissions of the first initial transmission.

10. The method of claim 1, further comprising using, by the network element, a synchronous non-adaptive downlink hybrid automatic repeat request (HARQ) scheme when a physical downlink control channel (PDCCH) is not used for retransmission.

11. The method of claim 1, wherein the network element is a victim node in a heterogeneous network, and wherein the victim node configures the restricted subframe pattern such that a user equipment (UE) receives the at least one retransmission when an almost blank subframe (ABS) is transmitted by an aggressor node in the heterogeneous network.

12. The method of claim 11, wherein the victim node is at least one of:
    a pico cell;
    a femto cell;
    a macro cell; or
    a relay.

13. The method of claim 1, wherein the fixed number of subframes is equal to 8 subframes, and wherein the predetermined number of subframes is equal to twelve subframes.

14. A network element in a wireless communications network, the network element comprising:
    a processor configured such that the network element, configured to utilize time domain measurement resource restriction to mitigate interference, transmits a first initial transmission under a semi-persistent scheduling (SPS) scheme,
    wherein retransmissions of the first initial transmission follow a first retransmission pattern that is aligned with a restricted subframe pattern,
    wherein the processor is further configured such that the network element transmits a second initial transmission under the SPS scheme,
    wherein retransmissions of the second initial transmission follow a second retransmission pattern, wherein the second retransmission pattern allows at least one retransmission of the second initial transmission to occur in a restricted subframe, wherein retransmissions in the first retransmission pattern occur every fixed number of subframes and coincide with restricted subframes, and wherein the at least one retransmission of the second initial transmission occurs a predetermined number of subframes later than the second initial transmission, the predetermined number being different than the fixed number.

15. The network element of claim 14, wherein a scheduler in the network element adjusts the second retransmission pattern to align the at least one retransmission of the second initial transmission to the restricted subframe.

16. The network element of claim 14, wherein restricted subframes occur at least in a 1/8 pattern, wherein initial transmissions occur every 20 subframes, wherein the fixed number of subframes is equal to 8 subframes, and wherein the predetermined number of subframes is equal to twelve subframes.

17. The network element of claim 14, wherein restricted subframes occur at least in a 1/8 pattern, wherein a first set of initial transmissions and a second set of initial transmissions each occur every 40 subframes with a 24 subframe offset between the first set of initial transmissions and the second set of initial transmissions, and wherein retransmissions occur every 8 subframes and coincide with restricted subframes.

18. The network element of claim 17, wherein the number of retransmissions of the second initial transmission is limited to one.

19. The network element of claim 14, wherein restricted subframes do not occur in a 1/8 pattern, and wherein initial transmissions and retransmissions align with restricted subframes.

20. The network element of claim 19, wherein initial transmissions occur every 20 subframes, wherein retransmissions occur 8 subframes after an initial retransmission or a previous retransmission, and wherein restricted subframes are aligned with initial transmissions or retransmissions.

21. The network element of claim 14, wherein the network element activates, reactivates, or releases SPS in a restricted subframe protected from interference.

22. The network element of claim 14, wherein the network element uses a more robust modulation and coding scheme for transmitting data packets in the second initial transmission and retransmissions of the second initial transmission than the network element uses for transmitting data packets in the first initial transmission and retransmissions of the first initial transmission.

23. The network element of claim 14, wherein the network element uses a synchronous non-adaptive downlink hybrid automatic repeat request (HARQ) scheme when a physical downlink control channel (PDCCH) is not used for retransmission.

24. The network element of claim 14, wherein the network element is a victim node in a heterogeneous network, and wherein the victim node configures the restricted subframe pattern such that a user equipment (UE) receives the at least one retransmission when an almost blank subframe (ABS) is transmitted by an aggressor node in the heterogeneous network.

25. The network element of claim 24, wherein the victim node is at least one of:
a pico cell;
a femto cell;
a macro cell; or
a relay.

26. The network element of claim 14, wherein the fixed number of subframes is equal to 8 subframes, and wherein the predetermined number of subframes is equal to twelve subframes.

27. A method for operating a user equipment (UE) in a wireless communications network, the method comprising:
receiving, by the UE, a first initial transmission under a semi-persistent scheduling (SPS) scheme, wherein retransmissions of the first initial transmission follow a first retransmission pattern; and
receiving, by the UE, a second initial transmission under the SPS scheme, wherein retransmissions of the second initial transmission follow a second retransmission pattern, the second retransmission pattern allowing at least one retransmission of the second initial transmission to occur in a restricted subframe during which an almost blank subframe (ABS) may be transmitted by an aggressor or neighbor cell to protect the restricted subframe from interference,
wherein retransmissions in the first retransmission pattern occur every fixed number of subframes and coincide with restricted subframes, and wherein the at least one retransmission of the second initial transmission occurs a predetermined number of subframes later than the second initial transmission, the predetermined number being different than the fixed number.

28. A user equipment (UE) comprising:
a processor configured such that the UE receives a first initial transmission under a semi-persistent scheduling (SPS) scheme,
wherein retransmissions of the first initial transmission follow a first retransmission pattern,
wherein the processor is further configured such that the UE receives a second initial transmission under the SPS scheme,
wherein retransmissions of the second initial transmission follow a second retransmission pattern, and
wherein the second retransmission pattern allows at least one retransmission of the second initial transmission to occur in a restricted subframe during which an almost blank subframe (ABS) may be transmitted by an aggressor or neighbor cell to protect the restricted subframe from interference,
wherein retransmissions in the first retransmission pattern occur every fixed number of subframes and coincide with restricted subframes, and wherein the at least one retransmission of the second initial transmission occurs a predetermined number of subframes later than the second initial transmission, the predetermined number being different than the fixed number.

* * * * *